(12) United States Patent
Lee et al.

(10) Patent No.: US 11,232,689 B2
(45) Date of Patent: Jan. 25, 2022

(54) SMOKE DETECTION METHOD WITH VISUAL DEPTH

(71) Applicant: METAL INDUSTRIES RESEARCH & DEVELOPMENT CENTRE, Kaohsiung (TW)

(72) Inventors: Tsung-Han Lee, Kaohsiung (TW); Jinn-Feng Jiang, Kaohsiung (TW); Shih-Chun Hsu, Kaohsiung (TW); Tsu-Kun Chang, Kaohsiung (TW); Hung-Yuan Wei, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 0 days.

(21) Appl. No.: 16/733,814

(22) Filed: Jan. 3, 2020

(65) Prior Publication Data

US 2020/0273309 A1    Aug. 27, 2020

(30) Foreign Application Priority Data

Jan. 4, 2019 (TW) ................................ 108100444

(51) Int. Cl.
*G08B 17/00* (2006.01)
*G08B 17/10* (2006.01)
(Continued)

(52) U.S. Cl.
CPC .............. *G08B 17/10* (2013.01); *G01B 11/25* (2013.01); *G06K 9/00771* (2013.01)

(58) Field of Classification Search
CPC ...... G08B 17/10; G08B 17/125; G01B 11/25; G08K 9/00771; G06K 9/2036; G06K 9/00791; G06T 7/50; G06T 7/0002
See application file for complete search history.

(56) References Cited

U.S. PATENT DOCUMENTS 5,289,275 A * 2/1994 Ishii ................... G06K 9/00362
                                                                340/578
6,184,792 B1 * 2/2001 Privalov .............. G08B 17/125
                                                                340/578
(Continued)

FOREIGN PATENT DOCUMENTS

CN     102201146 A     9/2011
CN     106250930 A    12/2016
(Continued)

OTHER PUBLICATIONS

International Search Report Issued by Foreign Patent Office in Application No. 10202000048V dated Jun. 20, 2020.
(Continued)

*Primary Examiner* — Ojiako K Nwugo
(74) *Attorney, Agent, or Firm* — Rosenberg, Klein & Lee

(57) ABSTRACT

The present invention provides a smoke detection method with visual depth, which uses an image camera and a depth camera to extract surrounding images and surrounding depth information. A vehicle is used to patrol an area, such as the area of a processing factory, for receiving the surrounding environment information and detecting existence of burning objects or smoke. Then a processor adopting the clustering algorithm is used to estimate the smoke distribution or the location of fire source of burning objects, and uses an alarm to provide alarm information. Thereby, the rescue crew can prepare in advance and respond immediately. By providing the correct information to the firemen in the fire scenes, the time to control the fire can be shortened and the time for evacuation can be increased.

10 Claims, 4 Drawing Sheets

(51) Int. Cl.
  *G06K 9/00* (2006.01)
  *G01B 11/25* (2006.01)

(56) References Cited

U.S. PATENT DOCUMENTS

| | | | | |
|---|---|---|---|---|
| 2011/0058037 A1* | 3/2011 | Hanses | ................ | G08B 29/183 |
| | | | | 348/143 |
| 2015/0332571 A1* | 11/2015 | Dortch | ................ | G08B 29/185 |
| | | | | 340/584 |
| 2016/0307424 A1* | 10/2016 | Mills | ................ | G06K 9/00771 |
| 2019/0113414 A1* | 4/2019 | Tsuzuki | ............... | G08B 21/182 |
| 2020/0054905 A1* | 2/2020 | Livchak | ................ | G08B 17/10 |
| 2020/0292445 A1* | 9/2020 | Morimoto | ................ | G01J 5/48 |

FOREIGN PATENT DOCUMENTS

| | | |
|---|---|---|
| CN | 106621139 A | 5/2017 |
| CN | 106853794 A | 6/2017 |
| CN | 108876856 A | 11/2018 |
| JP | H11-296654 A | 10/1999 |
| JP | 2002-42271 A | 2/2002 |
| JP | 2012-118698 A | 6/2012 |
| KR | 101084719 B1 | 11/2011 |
| KR | 101224494 B1 | 1/2013 |
| KR | 10-1679148 B1 | 12/2016 |
| KR | 101679148 B1 | 12/2016 |
| TW | M571750 U | 12/2018 |

OTHER PUBLICATIONS

Office Action dated Jan. 13, 3021 for corresponding JP Patent Application No. 2020-000090.
Office Action issued on Apr. 29, 2021 for corresponding CN Application No. 202010006428.2.

* cited by examiner

SMOKE DETECTION METHOD WITH VISUAL DEPTH

FIELD OF THE INVENTION

The present invention relates to a smoke detection method with visual depth, which is a detection method using the clustering algorithm to estimate the smoke distribution of burning objects or the location of fire source thereof for providing fire information to rescue crew.

BACKGROUND OF THE INVENTION

The population density in Taiwan is high and thereby the living space is limited. Current residence houses are mostly collective tall buildings. Fires occurring in tall buildings usually lead to serious damages in people and belongings. Thereby, complete fire-preventive equipment is crucial for people living in urban environments with tall buildings. Different fire alarm devices are provided for adapting to the urban environments with dense tall buildings.

The fire alarm device according to the prior art detects by the concentration of smoke and temperature sensors. The detector and alarm will not be triggered unless the fire has occurred for a period and the smoke has accumulated to a certain concentration. The smoke and fire detection systems based on temperature can detect flame and smoke immediately and launch alarms. Unfortunately, since the fire alarm devices according to the prior art is fixed, they are limited by distance and space, making them unsuitable for open spaces, areas with many corners, or outdoor spaces. In addition, the fire alarm devices according to the prior art cannot provide the information such as the location of fire and the smoke distribution when a fire occurs. Besides, the real-time fire detector based on temperature might have the problem of false alarms.

A fire detection device combined with a camera can acquire more fire-related information real-timely from the monitor. Compared with the smoke detection and temperature sensing devices, it can detect stably and response rapidly. Thereby, vision-based fire and smoke detection devices have become an important development direction for researching and designing detection devices for fire prevention.

Accordingly, the present invention provides a smoke detection method with visual depth, which uses an image camera and a depth camera to photograph the fire scene for acquiring surrounding images and depth images. Then a processor adopts the clustering algorithm to distinguish the smoke distribution and the location of fire source of the burning objects. By illustrating the fire scene completely, the rescue crew can respond promptly and the correct information can be provided to the firemen in the fire scene. By shortening the time to extinguish the fire, the survival opportunity of people can be improved.

SUMMARY

An objective of the present invention is to provide a smoke detection method with visual depth, which uses an image camera and a depth camera to photograph the fire scene for acquiring surrounding images and depth images. Then a processor adopts the clustering algorithm to estimate the smoke distribution and the location of fire source of one or more burning object in the surrounding images.

To achieve the above objective and effect, the present invention provides a smoke detection method with visual depth, which comprises steps of: extracting a plurality of surrounding images according to one or more image camera of a vehicle, and acquiring a plurality pieces of surrounding depth information of the plurality of surrounding images according to one or more depth camera of the vehicle; identifying one or more burning object in the plurality of surrounding images located on one side of the vehicle according to a processor; acquiring image information and an outline of the one or more burning object according to the plurality of surrounding images and the plurality pieces of surrounding depth information; estimating the smoke distribution or a location of fire source of the one or more burning object according to the image information and the outline of the one or more burning object and according to a clustering algorithm; and producing alarm information according to the smoke distribution or the location of fire source of the one or more burning object.

According to an embodiment of the present invention, in the step of judging if the plurality of surrounding images including one or more burning object located on one side of the vehicle according to a processor, the one or more burning object includes smoke and a fire source.

According to an embodiment of the present invention, the one or more depth camera includes a structured-light projection module and a structured-light camera. The structured-light projection module projects a plurality of light planes to the one or more burning object. The structured-light camera receives the projections of the plurality of light planes and reflects a light-image message for acquiring the plurality pieces of surrounding depth information.

According to an embodiment of the present invention, the structured-light projection module includes a laser light-emitting device and a lens set.

According to an embodiment of the present invention, in the step of producing alarm information according to the smoke distribution or the location of fire source of the one or more burning object, one or more audio unit of the alarm module is adopted to launch the alarm information.

DETAILED DESCRIPTION

In order to make the structure and characteristics as well as the effectiveness of the present invention to be further understood and recognized, the detailed description of the present invention is provided as follows along with embodiments and accompanying figures.

The present invention provides a smoke detection method with visual depth, which uses a processor adopting the clustering algorithm to estimate the smoke distribution or the location of fire source of burning objects, and uses an alarm to provide alarm information. Thereby, the rescue crew can prepare in advance and respond immediately. By providing the correct information to the firemen in the fire scenes, the time to control the fire can be shortened and the time for evacuation can be increased.

Figure 1:
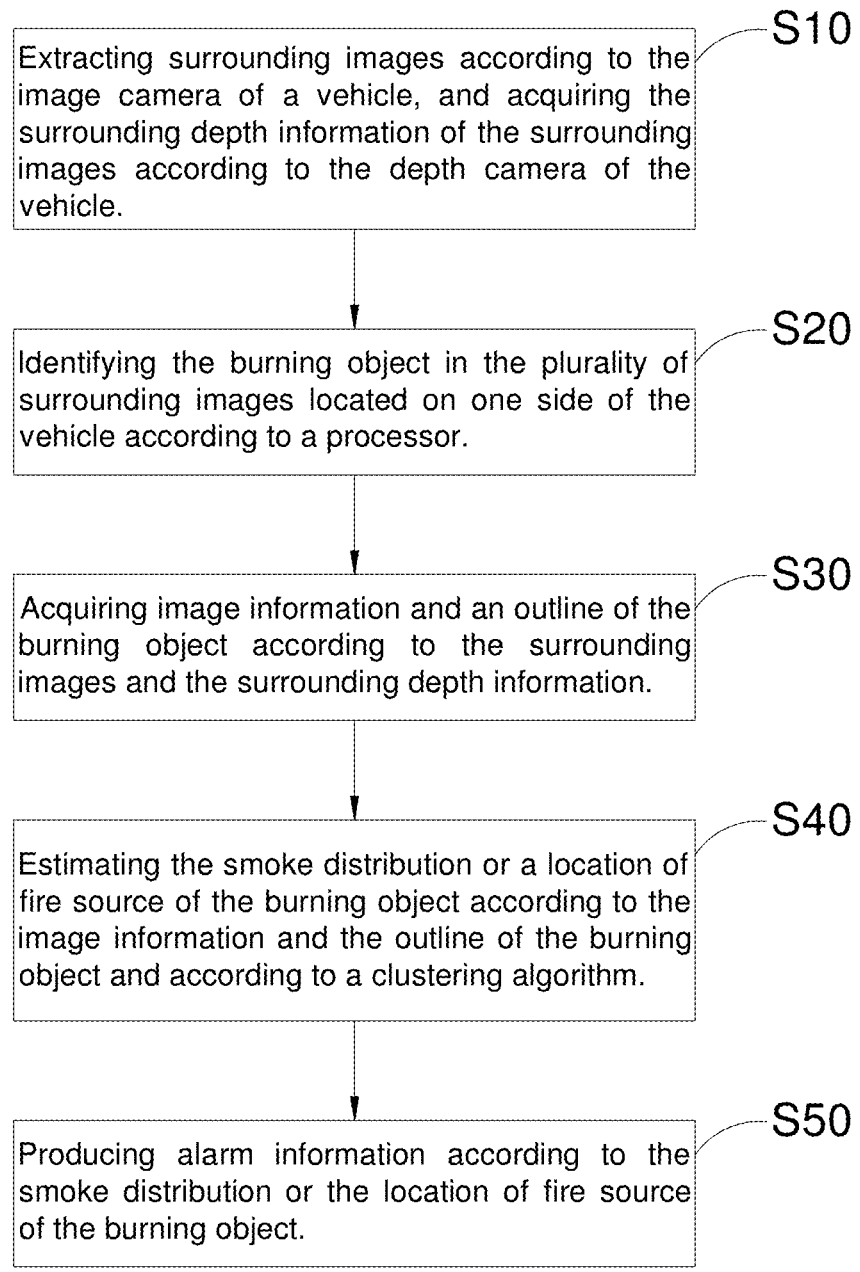
FIG. 1 shows a flowchart according to an embodiment of the present invention.

Please refer to FIG. 1, which shows a flowchart according to an embodiment of the present invention. As shown in the figure, the smoke detection method with visual depth according to the present embodiment comprises the following steps:

Step S10: Extracting surrounding images according to the image camera of a vehicle, and acquiring the surrounding depth information of the surrounding images according to the depth camera of the vehicle;

Step S20: Identifying the burning object in the plurality of surrounding images located on one side of the vehicle according to a processor;

Step S30: Acquiring image information and an outline of the burning object according to the surrounding images and the surrounding depth information;

Step S40: Estimating the smoke distribution or a location of fire source of the burning object according to the image information and the outline of the burning object and according to a clustering algorithm; and Step S50: Producing alarm information according to the smoke distribution or the location of fire source of the burning object.

Figure 2:
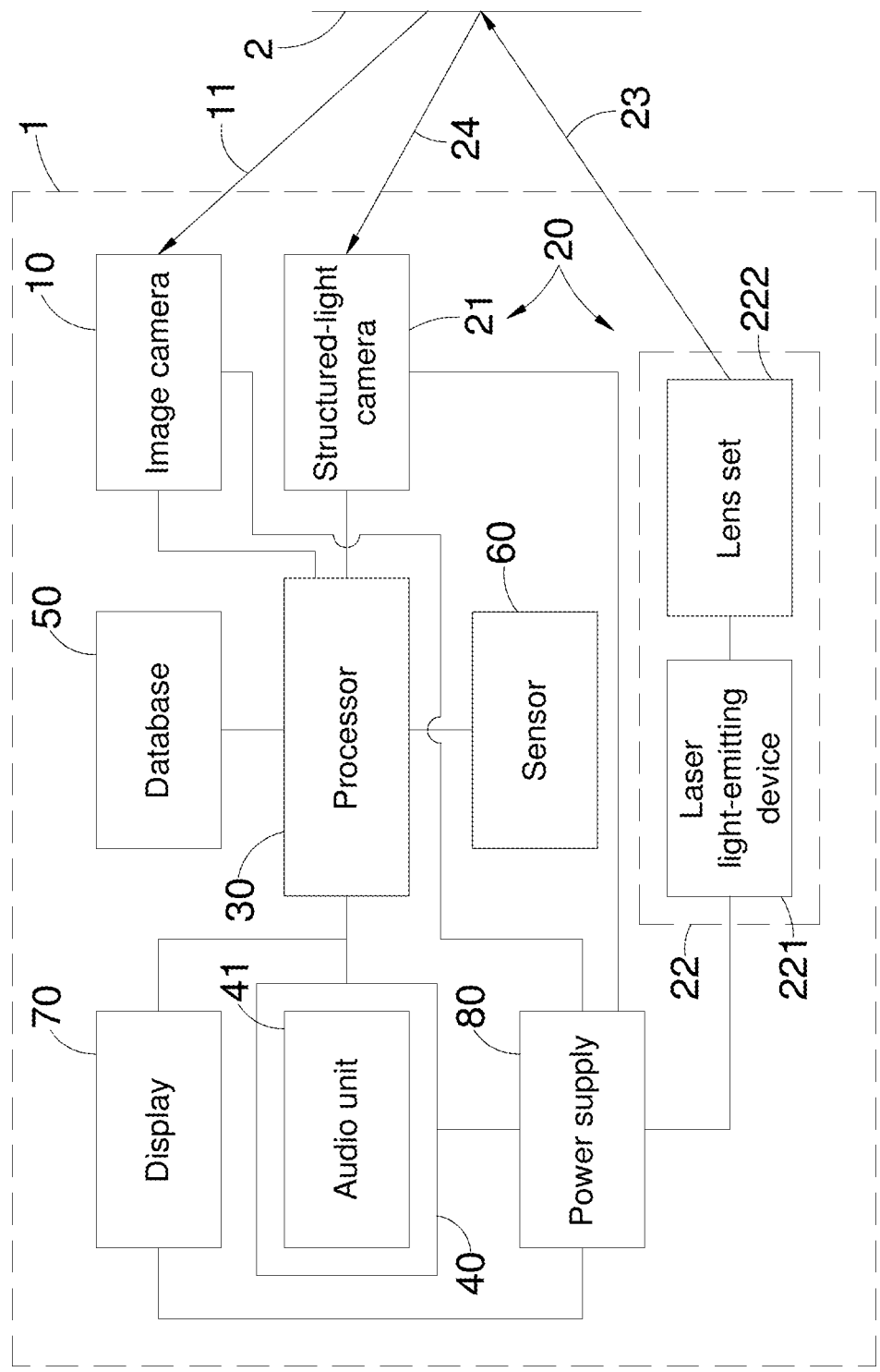
FIG. 2 shows a structural schematic diagram according to an embodiment of the present invention.

Please refer again to FIG. 1 and FIG. 2. FIG. 2 shows a structural schematic diagram according to an embodiment of the present invention. As shown in the figures, in the step S10, one or more image camera 10 of a vehicle is used to photograph the surrounding for extracting a plurality of surrounding images; and one or more depth camera 20 of the vehicle 1 is used to acquire a plurality pieces of surrounding depth information of the plurality of surrounding images. The surrounding depth can refer to the distance between the depth camera 20 and various surrounding locations. According to an embodiment, the vehicle 1 can be a mobile vehicle including unmanned mobile vehicle, for example, unmanned aerial vehicles unmanned ground vehicles. The image camera 10 includes image sensors such as CCD or CMOS sensors. In addition, the image camera 10 can include night vision devices or active infrared lighting for supporting night vision functions.

Figure 3:
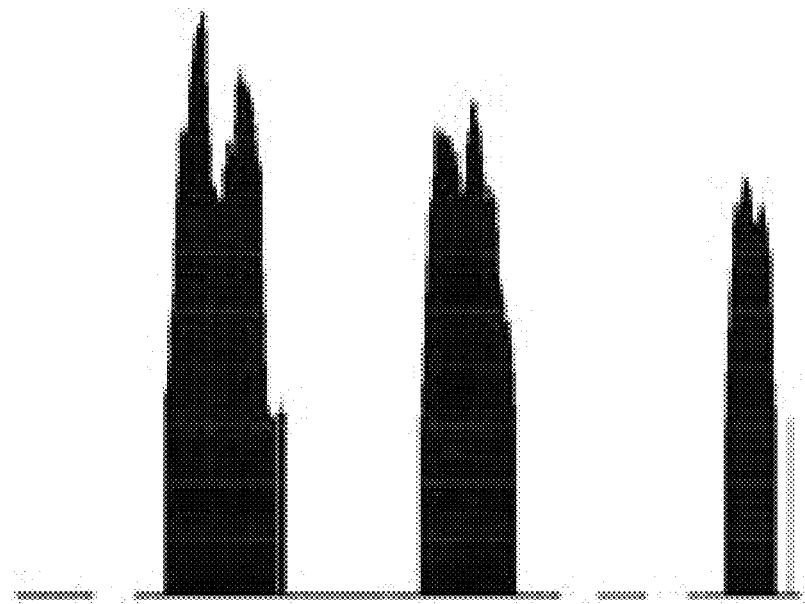
FIG. 3 shows a schematic diagram of binarization threshold value according to an embodiment of the present invention.

Please refer to FIGS. 1 to 3. FIG. 3 shows a schematic diagram of binarization threshold value according to an embodiment of the present invention. In the step S20, the processor 30 adopts dilation and erosion to binarize the images in the HSV color space. The acquired plurality of surrounding images are analyzed for identifying the target:

$$m = \Sigma_{i=1}^{n} f(x, y) \qquad \text{Equation 1}$$

where m is the binarization threshold value; f is the input image; n is all pixel items; and f(x,y) is the greyscale value of the pixel coordinates. By using the above Equation 1, the one or more burning object 2 located on one side of the vehicle 1 in the plurality of surrounding images can be identified.

The processor 30 is coupled to the image camera 10 and one or more depth camera 20. The one or more depth camera 20 includes a structured-light projection module 22 and a structured-light camera 21. When the image camera 10 extracts a plurality of surrounding images, the structured-light projection module 22 projects a plurality of light planes 23 to the surface of the one or more burning object correspondingly. Then the structured-light camera 21 receives a light-image message reflected from the projection of the plurality of surrounding images for acquiring a plurality pieces of surrounding depth information of the plurality of surrounding images. The detection method according to the present embodiment is to use the structured-light projection module 22. The principle is that a light source is used to project controllable light spots, stripes, or planes on the surface of the object under test. Then a sensor such as a camera is used to capture the reflected image. After geometric calculations, the stereoscopic coordinates of the object will be given. According to a preferred embodiment, the structured-light projection module 22 adopts a laser light-emitting device 221 as the light source. Laser is superior to general light sources in its high coherence, low attenuation, long measurement distance, high accuracy, as well as low vulnerability to the influence by other light sources. The laser provided by the laser light-emitting device 221 is dispersed by a lens set 222 to form a light plane 23 in the space. According to a preferred embodiment, the lens set 222 can include a pattern lens, which includes patterned microstructures to enable the light plane 23 formed by the transmissive laser to own pattern features, such as light-spot matrix on a two-dimensional plane.

Please refer to FIGS. 1 and 2. In the step S30, the processor 30, which can be a field-programmable gate array (FPGA), calculates and analyzes the plurality of surrounding images and the plurality pieces of surrounding depth information. By using the variation, the distance between the one or more burning object 2 and the vehicle 1, and the image information and an outline of the one or more burning object will be given.

Please refer to FIGS. 1 and 2. In the step S40, estimate the smoke distribution or a location of fire source of the one or more burning object 2 according to the image information and the outline of the one or more burning object 2 and according to a clustering algorithm. The clustering algorithm is to use the plurality pieces of depth information to give the image formation of the one or more burning object 2. Assume that the sample number m is $\{x^1, x^2, x^3, \ldots x^m\}$, $x^i \in R^n$, where $R^n$ is the statistical reference model. The K clustering centers selected randomly from the sample set i is $\{\mu_1, \mu_2, \mu_3, \ldots \mu_k\}$, $\mu_j \in R^n$. Calculate the cluster center for each sample set i to give:

$$C^i = 1 \sim K \qquad \text{Equation 2}$$

$$C^i = \text{argmin } \|x^i - \mu_j\|^2 \qquad \text{Equation 3}$$

where K is the number of clusters; $C^i$ is the classification of the sample set i closest to the cluster K; $\mu_j$ is the estimated location of the first cluster center; and j is the center of mass of each cluster center. According to Equation 3:

$$\mu_j = \frac{\sum_{i=1}^{m} \{c^i = j\} x^i}{\sum_{i=1}^{m} \{c^i = j\}} \qquad \text{Equation 4}$$

According to Equation 4, reducing a point of the cluster K gives the following equations:

$$\mu_j = \frac{x^1, x^2, x^3, \ldots x^m}{x^i}, \mu_j' = \frac{x^1, x^2, x^3, \ldots x^m}{x^i - 1} \qquad \text{Equation 5}$$

$$\mu_j' = \frac{\mu_j x^i - x^m}{x^i - 1} \qquad \text{Equation 6}$$

$$\mu_j' = \frac{\mu_j(x^i - 1) + \mu_j - x^m}{x^i - 1} \qquad \text{Equation 7}$$

$$\mu_j' = \mu_j + \frac{\mu_j - x^m}{x^i - 1} \qquad \text{Equation 8}$$

where $\mathring{\mu}_j$ is the estimated location of the second cluster center.

By using the clustering algorithm as described above, the fire source and the diffusion and distribution of smoke can be given rapidly. Then the information of on-site situation can be delivered rapidly to related staff for judgement. After judgement, the on-site firemen can be informed with the coping method for cutting the spreading direction of fire and dispelling smoke early. Thereby, the efficiency of rescue and extinguishment of fire can be enhanced.

Please refer to FIGS. 1 and 2. In the step S50, the processor 30 is coupled to an alarm module 40, which includes one or more audio unit 41. The alarm information is produced according to the smoke distribution or the locations of fire source of the one or more burning object and provided to the one or more audio unit 41 for launching alarm such as alarm sound. According to the present embodiment, the alarm module 40 can be connected wirelessly to remote devices via various wireless communication methods such as Wi-Fi, 3G, 4G, 5G, Bluetooth. In addition, the information is disposed on a display 70 coupled with the processor 30 for providing the information of the fire scene.

Please refer again to FIG. 2. As shown in the figure, the processor 30 is coupled to a database 50, which is used for storing the plurality of surrounding images and the plurality pieces of surrounding depth information estimated by the processor 30 and extracted by the image camera 10 and the depth camera 20. According to the present embodiment, the processor 30 is further coupled to a sensor 60, which can sense the moving state of the vehicle 1. Thereby, the moving speed of the one or more burning object 1 can be estimated for prevent the vehicle 1 from bumping into the one or more burning object 1.

According to a preferred embodiment, a power supply 80 is disposed on the vehicle 1 and connected electrically to the image camera 10, the structured-light unit 21 and the laser light-emitting device 221 of the depth camera 20, the alarm module 40, and the display 70 for supplying power source.

Figure 4:
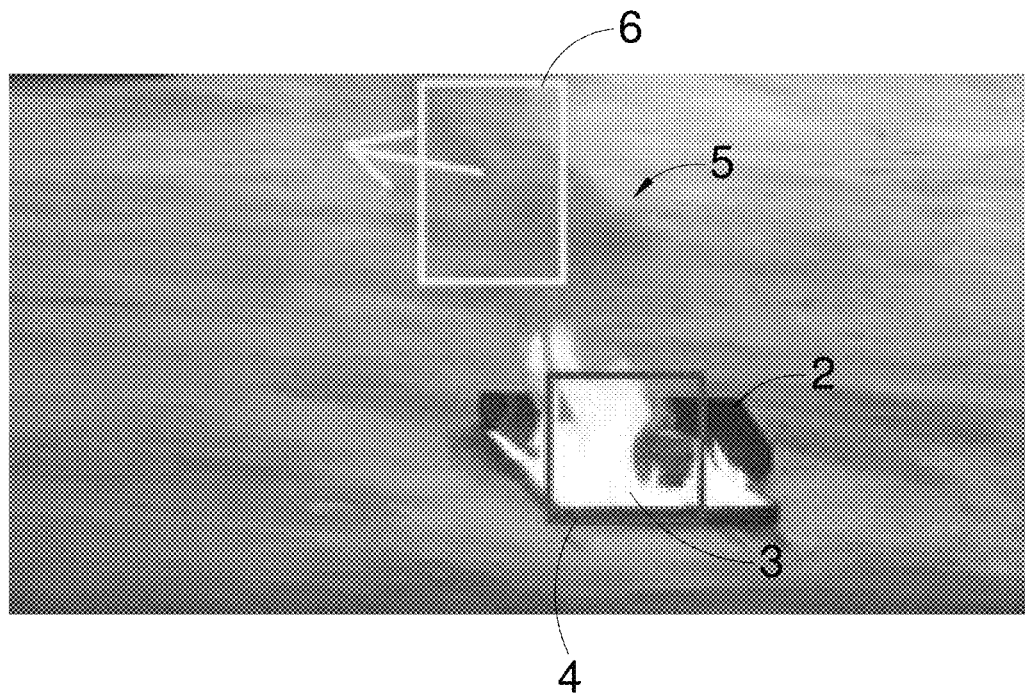
FIG. 4 shows a schematic diagram of detecting flame according to the present invention.

Please refer to FIG. 4, which shows a schematic diagram of detecting flame according to the present invention. As shown in the figure, the surrounding image includes one or more burning object 2, which includes smoke 5 and a fire source 3. According to the present embodiment, the processor 30 estimates the smoke distribution 6 of the smoke 5 and the location 4 of the fire source. The vehicle 1 is used to patrol a region and detect the locations of the first source and the smoke as well as the spreading direction of the smoke. By using the clustering algorithm, the concentration portion of the fire source can be identified. Then the alarm is launched to the rescue crew for coping with the situation.

To sum up, the present invention provides a smoke detection method with visual depth, which mainly uses the image camera and the depth camera to form dual lenses for photographing the fire scene. The images are transmitted to the surveillance crew via Wi-Fi network. Then the fire scene can be seen remotely in the smoke detection system and providing the following benefits:

1. Classify the flame and smoke using the image module with visual depth, so that the rescue crew can know the severity level of fire and extinguish the fire rapidly. In addition, by using the clustering algorithm, the locations of the smoke and the fire source can be identified. Thereby, the rescue crew can put out the fire promptly and inform the trapped people to evacuate early for reducing casualties.
2. The vehicle is used to illustrate the factory scene on the remote device of the staff. When a disaster occurs, the firemen are informed immediately for judging and handling promptly according the fire scene. Compared with the past, in which assessment and action cannot be started before reaching the fire scene, the present invention can improve the response efficiency for fire as well as increasing the rescue efficiency.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A smoke detection method with visual depth, comprising steps of:
    providing an image camera and a depth camera;
    extracting a plurality of surrounding images according to said image camera, and acquiring a plurality pieces of surrounding depth information of said plurality of surrounding images according to said depth camera;
    identifying one or more burning object in said plurality of surrounding images according to a processor;
    acquiring image information and an outline of said one or more burning object according to said plurality of surrounding images and said plurality pieces of surrounding depth information;
    estimating the smoke distribution of said one or more burning object or a location of fire source thereof according to said image information of said one or more burning object and said outline thereof and according to a clustering algorithm; and
    producing alarm information according to the smoke distribution of said one or more burning object or the location of fire source thereof.

2. The smoke detection method with visual depth of claim 1, wherein said step of identifying one or more burning object in said plurality of surrounding images according to the processor, said one or more burning object includes smoke and a fire source.

3. The smoke detection method with visual depth of claim 1, wherein said one or more depth camera includes a structured-light projection module and a structured-light camera; said structured-light projection module projects a plurality of light planes to said one or more burning object; said structured-light camera receives a light-image message reflected by the projection of said plurality of light plane for acquiring the plurality pieces of surrounding depth information.

4. The smoke detection method with visual depth of claim 3, wherein said structured-light projection module includes a laser light-emitting device and a lens set.

5. The smoke detection method with visual depth of claim 1, wherein said step of producing alarm information according to the smoke distribution of said one or more burning object or the location of fire source thereof, one or more audio unit of said alarm module is used to launch said alarm information.

6. The smoke detection method with visual depth of claim 1, wherein said clustering algorithm adopts the equations $$\mu_j = \frac{\sum_{i=1}^{m} \{c^i = j\} x^i}{\sum_{i=1}^{m} \{c^i = j\}}$$

and $C^i=\text{argmin} \|x^i-\mu_j\|^2$; K is the number of clusters; $C^i$ is the classification of the sample set i closest to the cluster K; $\mu_j$ is the estimated location of the first cluster center; and j is the center of mass of each cluster center.

7. The smoke detection method with visual depth of claim 1, wherein said image camera or said depth camera is installed on a vehicle.

8. The smoke detection method with visual depth of claim 7, wherein said vehicle includes a mobile vehicle.

9. A smoke detection method with visual depth, comprising steps of:
providing an image camera and a depth camera;
extracting a plurality of surrounding images according to said image camera, and acquiring a plurality pieces of surrounding depth information of said plurality of surrounding images according to said depth camera;
acquiring image information and an outline of one or more burning object according to said plurality of surrounding images and said plurality pieces of surrounding depth information;
estimating the smoke distribution or a location of fire source of said one or more burning object according to said image information of said one or more burning object and said outline thereof and according to a clustering algorithm; and
producing alarm information according to the smoke distribution of said one or more burning object or the location of fire source thereof;
where said clustering algorithm adopts the equations $$\mu_j = \frac{\sum_{i=1}^{m} \{c^i = j\} x^i}{\sum_{i=1}^{m} \{c^i = j\}}$$

and $C^i=\text{argmin} \|x^i-\mu_j\|^2$; K is the number of clusters; $C^i$ is the classification of the sample set i closest to the cluster K; $\mu_j$ is the estimated location of the first cluster center; and j is the center of mass of each cluster center.

10. The smoke detection method with visual depth of claim 9, further comprising a step of identifying said one or more burning object in said plurality of surrounding images according to a processor.

* * * * *